United States Patent [19]

Ginatta et al.

[11] Patent Number: 5,288,566
[45] Date of Patent: Feb. 22, 1994

[54] SEALED LEAD ACID BIPOLAR BATTERY

[75] Inventors: Marco V. Ginatta; Furio Rossetti, both of Turin, Italy

[73] Assignee: Edison Termoelettricc S.p.A., Milan, Italy

[21] Appl. No.: 796,077

[22] Filed: Nov. 20, 1991

[30] Foreign Application Priority Data

Nov. 21, 1990 [IT] Italy .................. 67909 A/90

[51] Int. Cl.$^5$ .................................... H01M 4/70
[52] U.S. Cl. ...................... 429/210; 429/233; 429/66
[58] Field of Search ............... 429/66, 210, 233, 245, 429/72, 73

[56] References Cited

U.S. PATENT DOCUMENTS

| | | | |
|---|---|---|---|
| 1,469,015 | 9/1923 | Jones . | |
| 3,141,795 | 7/1964 | Eisler . | |
| 3,728,158 | 4/1973 | Poe et al. | 429/219 X |
| 3,770,505 | 11/1973 | Bergum et al. | 429/210 X |
| 4,037,031 | 7/1977 | Jacob | 429/149 |
| 4,098,967 | 7/1978 | Biddick et al. | 429/210 |
| 4,275,130 | 6/1981 | Rippel et al. | 429/144 |
| 4,421,832 | 12/1983 | Uba | 429/72 |
| 4,460,666 | 7/1984 | Dinkler et al. | 429/245 X |
| 4,539,268 | 9/1985 | Rowlette | 429/54 |
| 4,729,933 | 3/1988 | Oswald | 429/66 X |
| 4,824,744 | 4/1989 | Kuo et al. | 429/245 X |
| 4,861,689 | 8/1989 | Clough et al. | 429/210 |
| 4,900,643 | 2/1990 | Eskra et al. | 429/210 X |
| 4,973,531 | 11/1990 | Zaima et al. | 429/66 X |

FOREIGN PATENT DOCUMENTS

| | | |
|---|---|---|
| 0039557 | 11/1981 | European Pat. Off. . |
| 0360942 | 4/1990 | European Pat. Off. . |
| 3907741 | 9/1990 | Fed. Rep. of Germany . |
| 429424 | 9/1911 | France . |
| 884768 | 8/1943 | France . |
| 2195853 | 3/1974 | France . |
| 56-63778 | 5/1981 | Japan . |
| 56-63779 | 5/1981 | Japan . |
| 56-64406 | 6/1981 | Japan . |
| 2160704 | 12/1985 | United Kingdom . |

*Primary Examiner*—Stephen Kalafut
*Attorney, Agent, or Firm*—Merchant & Gould, Smith, Edell, Welter & Schmidt

[57] ABSTRACT

A sealed lead acid dipolar storage battery, in which one or more dipolar electrodes (11) consist of lead or lead alloy foils (13) or of other electroconductive material. The foils (13) are provided with a reticular print (14) for keeping a layer of positive active compound (15) on one side of the foil (13) and a layer of negative active compound (15) on the other side. The electrodes (11) are stacked one on top of the other so as to alternate the different polarities; a series of separators in microfiber glass with a high porosity are interposed between the electrodes (11) in series.

8 Claims, 1 Drawing Sheet

U.S. Patent  Feb. 22, 1994  5,288,566
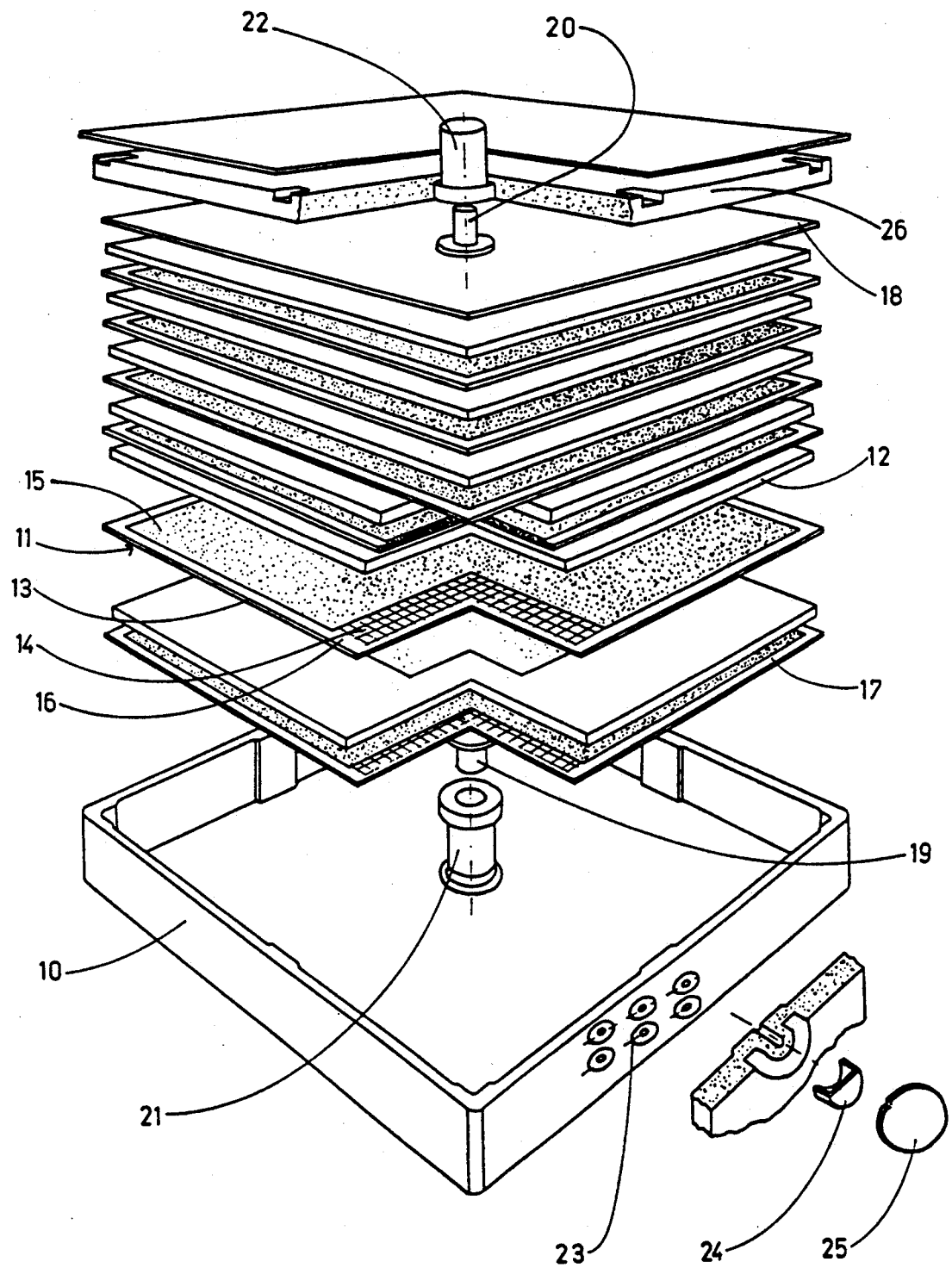

SEALED LEAD ACID BIPOLAR BATTERY

DESCRIPTION

The present invention refers to a lead acid storage battery with bipolar electrodes.

In the field of lead storage batteries there are already some gas recombination systems with a starved electrolyte.

This kind of battery is maintainance-free and avoids the risk of electrolyte leakage, and they are used for electronic applications and for stationary batteries.

A traditional lead storage battery is composed by lead electrodes with a layer of positive active compound opposed to other electrodes with a layer of negative active compound.

Several electrodes with the same polarity are welded together and immerged in an electrolytic bath. The end poles come out of the cell and are connected to the adjacent cell.

The most common limits of this configuration devices are a low specific energy of the battery due to the high lead content, that is not an active material. It is also difficult to utilize the active compound on the lead grids completely. Another drawback is concerned with the connections between the cells, where the greatest part of the voltage drop occurs.

Many efforts have been made in the field of lead storage batteries in order to reach better performances. Although present construction techniques give quite good results, they are still far from the full exploitation of the power that lead systems can offer.

A solution for this problem is to use a new kind of electrode that eliminates the above mentioned limits.

It is an object of the present invention to propose an accumulator with a low internal resistance, eliminating the actual connections between the cells where most of the voltage drops are concentrated. It is also a purpose to reach a better distribution of the current density due to an enlarged active surface of the conductive material contacting the active compounds, that can be therefore utilized in the best way.

Another purpose of this invention is to reduce the total weight of the accumulator by eliminating the connections and reducing the non active supporting material.

For these and for other objects, that will appear more clear with further description, this invention proposes to realize a sealed lead acid bipolar storage battery, characterized in that one or more bipolar electrodes consist of lead or lead alloy foils or of other electroconductive material, such as nickel/cadmium or nickel/iron, said foils being provided with a reticular print having a grid-like pattern for keeping a layer of positive active compound on one side of the foil and a layer of negative active compound on the other side; said electrodes being stacked one on top of the other so as to alternate the different polarities; a series of separators in microfiber glass with a high degree of porosity being interposed between the electrodes in series.

The accumulator according to the invention will now be described with reference to the enclosed drawing. The sole FIGURE is an exploded perspective view of the bipolar accumulator.

Referring to the drawing, a substantially parallelepipedal housing 10 contains all the components of the accumulator.

A stack of dipolar electrodes 11 shaped like rectangular plates, is located inside the housing 10. The electrodes are stacked adjacent with special separators 12 interposed between them. The separators can also be made of glass microfiber or of the kind used for sealed batteries.

Each electrode 11 is composed of a thin foil 13 made of lead or a lead compound, with a particular recticular print 14 having a grid-like pattern designed for holding the active compound 15. This is generally lead oxide, and it is spreaded out onto the reticular print 14 that represents a good support and consequently an excellent electric contact between the lamina 13 and the active compound 15 applied thereto.

The reticular print 14 does not cover the whole area of the lamina 13; as a matter of fact a side edge 16 is left uncovered for the application of a gasket (not shown) on the perimeter for the purpose of sealing or for the application of thermoplastic resins.

The separator 12 does not contact the perimetral packing so as to leave a narrow perimetral channel that is useful for introducing the electrolyte and that allows an easier filling also in the places that are more distant from the inlet valve.

For the execution of the laminas 13, a special polymeric material with an electroconductive matrix can be used instead of lead and lead alloys, reducing considerably the weight of the non-active parts. This special compound has to be light, with a high electric conductivity and ionic impermeability.

The reticular print 14 is characterized by relief crests or either side of the lamina 13 which is of the same material as the lamina 13 on which the active compound is applied. The relief crests of a surface, with respect to the opposite one, are displaced by half a pitch so as to render the structure stiffer.

The height of the relief crests obtained in the reticular print determines the thickness and the amount of the active compound 15 to be applied.

Each bipolar electrode 11 supports positive active compound spreaded on one of its sides, while the other side supports the negative active compound. The electrodes are stacked one on top of the other in such a way that the polarities are alternatively disposed. The microfiber glass microfiber separators 12 are interposed between the electrodes 11 and retain the necessary quantity of electrolyte.

The various bipolar electrodes 11, that are sealed against the housing 10, determine a series of cells that must be water-tight to prevent infiltration from the other cells and to avoid shortcircuits. The cells are filled with an electrolytic liquid, usually a sulfuric acid solution.

The passage of the electric current between the cells occurs orthogonally with respect to the surface of the foil 13 with no need of intermediate electrical connections.

Two monopolar electrodes 17 and 18 are fitted at the ends of the stack of bipolar electrodes 11, forming the terminal parts of the battery.

These electrodes have a reticular print 13, identical to the ones of the other dipolar electrodes, on the side that is facing the inside of the battery, and the active compound is present on the outside faces of the monopolar electrodes 17 and 18. Two collectors 19 and 20 are applied to these faces and are moreover connected to respective poles 21 and 22 sticking out of the housing 10 for the utilization of the battery.

The microfiber glass separators 12 retain the electrolyte inside and allow the recombination of the gasses that are present in the cells.

The thickness of the separators 12 is sized according to the amount of acid that is necessary. The separators 12 allow the battery to be used in closed area, which is the most important feature of sealed storage batteries. If the cell is not completely filled up with electrolyte, the separator 12 operates according to the gas recombination principle, allowing the oxygen that is developed at the positive monopolar electrode to flow through its own microporous structure during the recharge stage.

For improving the electric performance of the battery it is necessary to press the electrodes 11 and the separators 12 as a whole. In fact a greater capacity is obtained by increasing the contact between the electrolyte and the active compounds 15. This also causes an improvement of the electrochemical formation and a longer life of the battery.

The battery is fitted with vent plug 23 for the gas inside the cells; the sulfuric acid electrolyte is introduced through these valves, which are provided with a neoprene rubber cap 24 that lets the gas out of the battery at determined pressure values. A plastic lid 25 completes the upper part of valve 23.

The adjustment of the valves 23 is carried out by using each time rubber with different levels of hardness.

A load compensator 26 is inserted between the stack of electrodes 11 and the housing 10 for the purpose of recuperating the loss of compression on the unit formed by electrodes 11 and separators 12 that occurs when the acid is introduced. In this way the pressure that is required for the electrodes is maintained during the volume variations of the separator.

In fact when the electrolyte is introduced, the microfiber glass separator shrinks slightly, reducing the load that is imposed to the electrodes. Moreover the pressure variations that occur during the loading and unloading of the battery get compensated.

It is known that when the glass microfibre separators 12 are filled up they shrink and in doing so reduce the value of the compression that is given.

The load compensator 26, that consists of a plate in polyurethanic material, when it is freed it restores the value of the pressure that was lost during the load decrease.

Among the advantages that are offered by the present invention, some components of traditional accumulators have been eliminated, such as the collectors between the cells. This simplifies the operation of the assembly machines.

The compression between electrodes and separators prolongs the life of the battery as it impedes the shedding of the active compounds from the foils.

The voltage rating of the battery described here does not represent a restrictive example as it is possible to put a plurality of electrodes in series until a voltage ranging between 4-500 volts is reached.

I claim:

1. A seal lead acid bipolar storage battery, characterized in that one or more bipolar electrodes consist of foils of electroconductive material, said foils being provided with a reticular print having a grid-like pattern for keeping a layer of positive active compound on one side of the foil and a layer of negative active compound on the other side; said electrodes being stacked one on top of the other so as to alternate the different polarities; a series of separators in microfiber glass with a high porosity being interposed between the electrodes in series.

2. A storage battery according to claim 1 characterized in that the reticular print has relief crests on either sides of the foil where the positive and negative active compounds are applied.

3. A storage battery according to claim 1 characterized in that the relief crests on one surface are fitted displaced on half a pitch with respect to the opposite surface for stiffening the structure.

4. A storage battery according to claim 1 characterized in that the reticular print on the foils determines a non imprinted-channel on the edges of the foils made for fitting a perimetral gasket for the sealing against the housing; wherein the gasket is mounted on the electrodes and determines and seals a plurality of watertight cells containing the separators that are filled of electolythic liquid.

5. A storage battery according to claim 1 characterized in that it is provided with a load compensator for maintaining the required pressure on the electrodes.

6. A storage battery according to claim 5 characterized in that the load compensator consists of a polyurethanic plate.

7. A storage battery according to claim 4 characterized in that the separators do not contact the respective perimetral channel for the introduction of the electrolyte and for allowing an easier filling also in the places that are more distance from the inlet valve.

8. A storage battery according to claim 1 characterized in that it comprises a series of electrodes to reach voltages ranging between 4-500 volts.

* * * * *